Patented Mar. 17, 1953

2,631,998

UNITED STATES PATENT OFFICE 2,631,998

COPOLYMERS OBTAINED FROM TRIFLUOROCHLOROETHYLENE AND 1-FLUORO-1-CHLOROETHYLENE

Frank Gardiner Pearson, Bryn Mawr, Pa., assignor to American Viscose Corporation, Wilmington, Del., a corporation of Delaware No Drawing. Application October 1, 1948,
Serial No. 52,412

2 Claims. (Cl. 260—87.5)

This invention relates to polymeric materials and more particularly to copolymers obtained from trifluorochlorethylene and 1-fluoro-1-chlorethylene.

The present application is a continuation-in-part of my present application Serial No. 557,226, filed October 4, 1944, now abandoned.

The object of this invention is to produce new and useful compositions comprising copolymers of trifluorochlorethylene and 1-fluoro-1-chlorethylene. Another object is to produce such compositions comprising copolymers of trifluorochlorethylene and 1-fluoro-1-chlorethylene containing from 50 to 90 mole per cent of trifluorochlorethylene in the molecule.

A preferred embodiment of the invention is illustrated by the following example in which the proportions of reactants are given in parts by weight unless otherwise indicated.

Example

A mixture of 18.9 parts of trifluorochlorethylene and 3.84 parts of 1-fluoro-1-chlorethylene was sealed in a glass pressure reactor containing 15 parts of acetone and 1% by weight (based on monomers) of a mixture of equal parts of lead tetraethyl and tertiary butyl hydroperoxide as a catalyst. The reactor was continuously rotated before a source of ultraviolet light for 144 hours and at a temperature of 30° C., at the end of which time the contents had solidified. The copolymer, which occurred in the form of a white powder and amounted to 11.4 parts, was insoluble, and was shown by analysis to contain 87.5 mole per cent of trifluorochlorethylene. It melted at 190° C.

The copolymers of trifluorochlorethylene and 1-fluoro-1-chlorethylene containing from about 60 to 90 mole per cent of trifluorochlorethylene, in the molecule, and obtained from mixtures of the monomers of approximately the same composition are characterized by exceptionally good chemical stability.

The catalysts preferred for use in the practice of this invention are mixtures of lead tetraethyl with a peroxy compound, that is with a compound containing the —O—O—linkage. Examples of these compounds are the diacyl peroxides such as benzoyl peroxide, salts of persulfuric acid such as ammonium and potassium persulfate, dialkyl peroxides such as diethyl peroxide, and alkyl hydroperoxides such as tertiary butyl hydroperoxide.

The process of this invention is generally conducted at room temperature, but higher temperatures in the range of 40 to 100° C. may be used if desired. The pressure employed will depend upon the monomer ratio and temperature, and is such as to maintain the liquid phase.

The products of the invention are adapted to a variety of uses. They may be used in the production of synthetic fibers, in molding plastics, films, foils, etc., or as adhesives, or coating compositions. For many of these purposes the copolymers may be combined with or prepared in the presence of plasticizers, stabilizers, fillers, pigments, dyes, softeners, natural resins or other synthetic resins, depending upon the purposes for which they are intended.

As a number of apparently widely different embodiments of this invention may be made without departing from the spirit and scope thereof it is to be understood that the invention is not limited to the specific embodiments thereof except as defined in the appended claims.

I claim:

1. The copolymerization product of trifluorochlorethylene and 1-fluoro-1-chlorethylene containing from 60 to 90 mole per cent of trifluorochlorethylene and from 10 to 30 mole per cent of 1-fluoro-1-chlorethylene in the copolymer molecule.

2. The copolymerization product of trifluorochlorethylene and 1-fluoro-1-chlorethylene containing about 87 mole per cent of trifluorochlorethylene and about 13 per cent of 1-fluoro-1-chlorethylene in the copolymer molecule.

FRANK GARDINER PEARSON.

REFERENCES CITED

The following references are of record in the file of this patent:

UNITED STATES PATENTS

| Number | Name | Date |
| --- | --- | --- |
| 2,328,510 | Thomas et al. | Aug. 31, 1943 |
| 2,419,008 | Coffman et al. | Apr. 15, 1947 |
| 2,479,367 | Joyce et al. | Aug. 16, 1949 |
| 2,497,046 | Kropa | Feb. 7, 1950 |
| 2,513,312 | Hanford | July 4, 1950 |

FOREIGN PATENTS

| Number | Country | Date |
| --- | --- | --- |
| 465,520 | Great Britain | May 3, 1937 |
| 570,941 | Great Britain | July 30, 1945 |
| 596,943 | Great Britain | Jan. 14, 1948 |